Oct. 17, 1967  W. A. STAATS  3,347,785
METHOD AND APPARATUS FOR ION EXCHANGE REGENERATION
Filed Jan. 8, 1964  5 Sheets-Sheet 1

INVENTOR.
WILLIAM A. STAATS
BY Andrus & Starke
ATTORNEYS

INVENTOR.
WILLIAM A. STAATS
BY
Andrus & Starke
ATTORNEYS

INVENTOR.
WILLIAM A. STAATS
BY
Andrus & Starke
ATTORNEYS

INVENTOR.
WILLIAM A. STAATS
BY
Andrus & Starke
ATTORNEYS

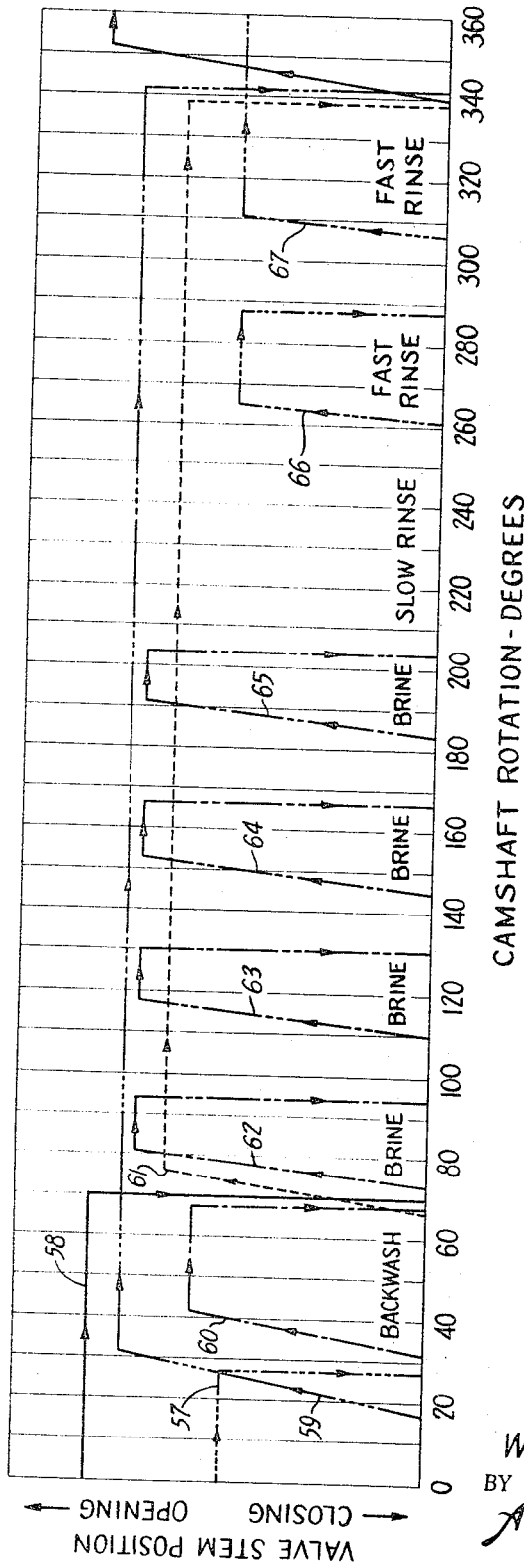

United States Patent Office 3,347,785
Patented Oct. 17, 1967

3,347,785
METHOD AND APPARATUS FOR ION EXCHANGE REGENERATION
William A. Staats, Torrance, Calif., assignor, by mesne assignments, to Culligan, Inc., North Brook, Ill., a corporation of Delaware
Filed Jan. 8, 1964, Ser. No. 336,555
12 Claims. (Cl. 210—35)

This invention relates to a method and apparatus for regenerating an ion exchange bed and particularly to a method of regenerating a water softening bed.

Water containing hardness ions such as calcium and magnesium is softened for domestic and commercial applications by passing the hard water through an ion exchange bed, normally a granular porous resin providing a large surface which is charged with sodium ions. In passing through the bed, sodium ions on the resin are exchanged for calcium and magnesium ions in the water and produce soft water at the outlet.

The exchange process depletes the sodium charge in the bed and eventually the bed loses the ability to properly soften the water. Generally, the bed is regenerated to remove the calcium and magnesium ions and again charge the bed with sodium ions. This is normally done by passing a strong solution of sodium chloride or brine through the bed to exchange the hardness ions for the sodium ions.

One of the principal problems encountered in water softeners is increasing the overall efficiency of the water softeners. Present systems generally are designed either with a minimum bed and large salt factor such that a low salt efficiency may be tolerated or with a large bed and low salt factor to obtain high salt efficiency. In the latter case, however, the system sacrifices potential capacity in that only a portion of the total potential capacity of the bed is used. The prior art has suggested various solutions. For instance, Patent 2,099,287 suggests a system wherein a pair of spaced brine quantities separated by a fresh water wash are employed. The second brine solution is recovered and employed as the first step of the succeeding regeneration cycle. As disclosed therein, the initial or recovered solution effects substantially complete regeneration with the second fresh solution being only very slightly effective as to maintain essentially the same purity. This system purportedly reduces the amount of sodium chloride employed by recovering the brine which was used as the final brine in a previous regeneration cycle.

The present invention provides a method and apparatus for improving the regeneration cycle. Generally, in accordance with the present invention, the regeneration cycle includes sequentially and alternately passing in a generally continuous flow process a series of pulses of a fresh solution of replacement ions or regenerating concentrate through the bed separated by fresh water or other rinse liquids through the ion exchange bed each with a relatively slow rinse rate or flow being employed between the brine pulses. Applicant has found that a fresh brine solution which is essentially free of calcium or magnesium ions should be employed for each brine pulse. Although improved results may be obtained from any multiple brine pulses separated by rinsing of the ion exchange bed, applicant has found that four or five pulses produce unusually satisfactory and highly improved regeneration results. The total quantity of brine employed will be similar to that employed in a single brine pass but it is separated into a selected number of separate brine pulses separated by slow rinses. Generally, the efficiency or exchange capacity of the bed increases with the number of brine pulsing. However, the regeneration cycle increases proportionately and consequently the particular system employed is a practical compromise. In the system of this invention, the brine concentration and the time of the cycles are direct factors in determining the particular cycle employed.

Applicant has further found that by introducing the brine solution immediately adjacent the surface of the bed, the theoretical maximum capacity of the resin can be obtained.

The present invention thus can be employed to appreciably either increase the capacity of the exchange bed or the efficiency of the system. If the capacity factor is improved, the resin bed can be reduced for the same application. If the salt efficiency is increased, the quantity of salt needed can be reduced. The present invention is thus particularly directed to providing maximum capacity with improved salt efficiency.

The drawings furnished herewith illustrate the best mode presently contemplated for carrying out the invention and the advantages heretofore discussed as well as others will be apparent from the description set forth hereinafter.

In the drawings:

FIG. 10 is a graph showing a pulse bringing cycle for a multiple port softener valve shown in the previous figures.

Figure 1:
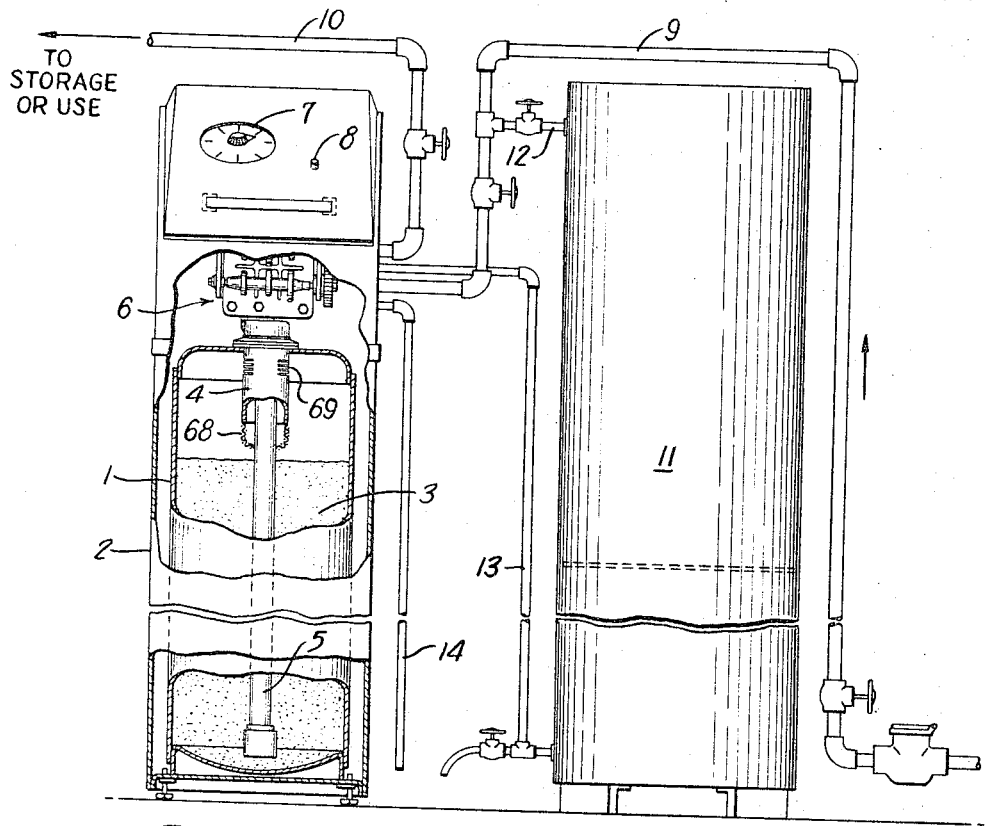
FIG. 1 is a front elevational view of a water softening system incorporating the present invention.
Figure 2:
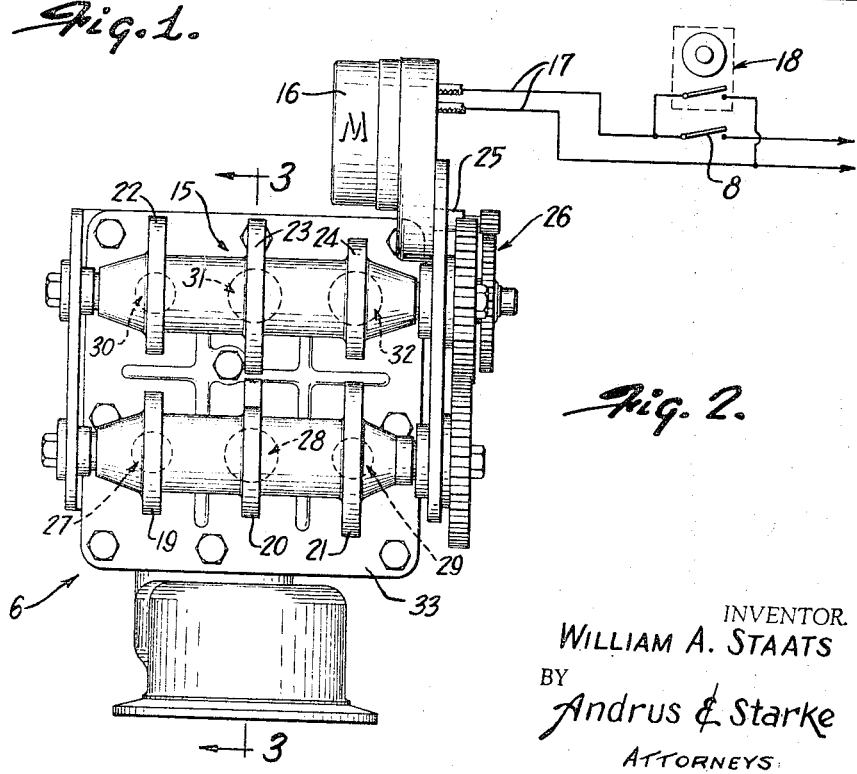
FIG. 2 is an enlarged elevational view of the control valve of the softener shown in FIG. 1.

Referring to the drawings and particularly to FIGS. 1 and 2, a water softener tank 1 is shown mounted within an outer decorative housing 2 and having an ion exchange bed 3 of a zeolite or the more currently employed synthetic resins. The bed 3 terminates in spaced relation to the top of tank 1 and defines a freeboard area or volume. A hard water inlet conduit 4 is attached at the top of the tank 1 and projects downwardly through the freeboard area terminating immediately adjacent the upper surface of the bed. A soft water outlet conduit 5 is also attached at the top of tank 1 concentrically within conduit 4 and extends downwardly to the bottom of the bed 3. The water thus passes from the inlet conduit 4 through the bed 3 and is withdrawn through the bottom of outlet conduit 5 as soft water.

A motor-driven control valve 6 is secured to the top of the tank 1 within decorative housing 2 for selective connecting of the conduits, as hereinafter described, for normal water service and for a bed regenerating cycle. The front top portion of housing 2 is slanted and carried suitable indicating and control devices such as a time indicating device 7, a control switch button 8 or the like. As such components do not form any part of the present invention, no further description thereof is given.

A hard water supply line 9 is connected to the control valve 6 and to the main incoming water source or system, not shown, and a soft water supply line 10 is connected to the valve 6 and to the consumer tap system.

A salt storage tank 11 is disposed adjacent to the water softener and is connected to a replenishing water supply line or conduit 12 to maintain a predetermined line level in tank 11; for example, a suitable float valve or the like, not shown, can be employed to open and close the line 12. A regenerating brine conduit 13 is connected to the lower end of the tank 11 and to the control valve 6 for supplying a brine solution to the bed 3 during a regeneration cycle. A drain line or conduit 14 is provided at valve 6 to carry the spent brine from the tank 1 to a suitable waste system, not shown.

Generally, in accordance with the present invention, the regeneration cycle includes a first or backwash cycle during which water is passed upwardly through the tank 1 and out through the conduit 4 and then successive brine cycles during which a plurality of individual, time-spaced pulses of brine are passed slowly through the softening bed 3 separated by relatively slow, fresh-water rinses. A terminal fast water rinse may also be provided.

The control valve 6 is motor driven and constructed with the appropriate valved openings for the several conduits to the softening tank to produce the desired sequence, as presently described.

Figure 3:
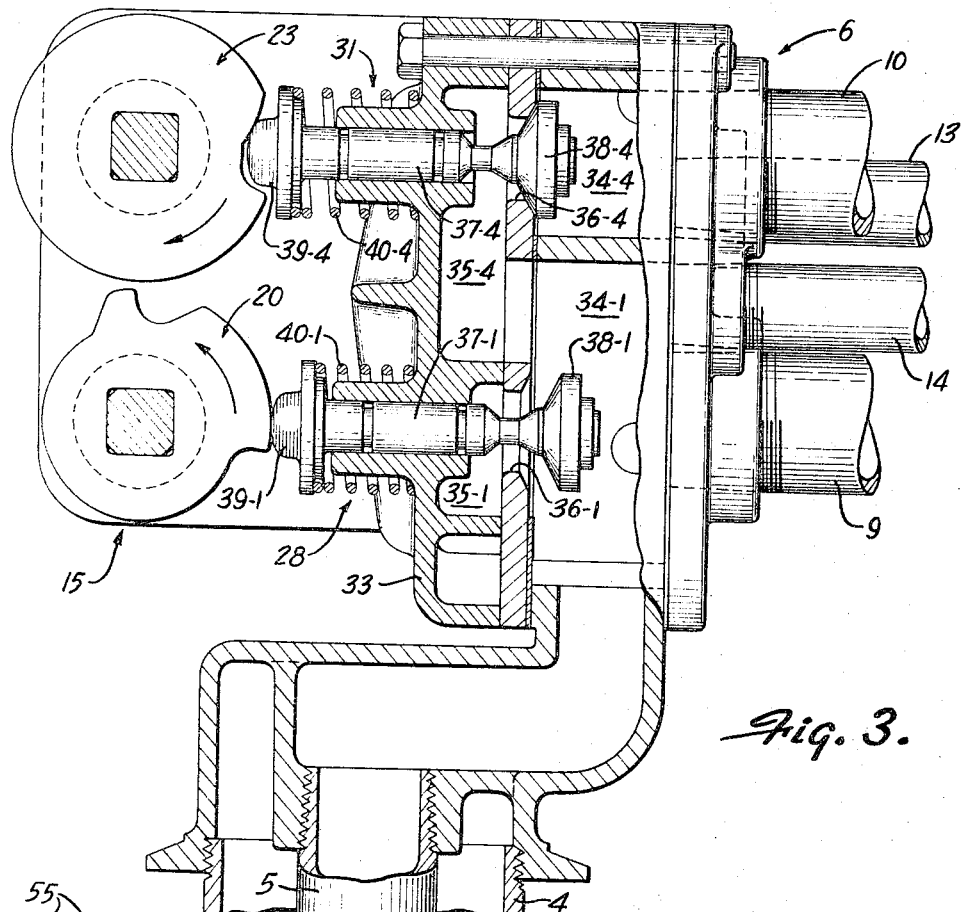
FIG. 3 is a view of the control valve shown in FIG. 2 with parts broken away and sectioned.

The illustrated control valve 6 is a six port valve actuated by a cam assembly 15 which in turn is driven by a timer motor 16. The motor 16 is selectively connected to incoming power lines 17 by a manual regeneration control push button unit 8 or a clock timer switch unit 18. The energization circuit for the motor 16 may be of any known or suitable variety and no further description thereof is given. Motor 16 is coupled to drive a plurality of cams 19, 20, 21, 22, 23 and 24 which form the cam assembly 15. In the illustrated embodiment, motor 16 has an output shaft 25 coupled by a gear reducing train 26 to simultaneously drive the cams 19 through 24 through one complete revolution, thereby completing a regeneration cycle. Each of the cams 19 through 24 selectively controls separate valves 27, 28, 29, 30, 31 and 32, respectively. The structure of valve 6 may be of any suitable construction and a commercially available valve assembly presently employed in water softeners is shown in FIGS. 2 and 3. For purposes of clarity of explanation and illustration of the present invention, the valve structure is diagrammatically shown in FIG. 5 and is described in connection therewith.

Valves 27 through 32 are formed in a single valve body 33. The valve 27 in FIG. 5 which constitutes a brine control valve is particularly described and corresponding elements in valves 28 through 32 are similarly numbered with distinguishing numbers −1 through −5 inclusive to distinguish the several components in the description and drawings.

Valve 27 includes a first valve chamber 34 and a second valve chamber 35 interconnected by a ported passageway 36 of reduced cross section. A valve stem 37 is slidably mounted in the first chamber 34 and carries at its inner end a valve closure 38 which is adapted to selectively open and close passageway 36 and thereby selectively open and block the communication between chambers 34 and 35. Valve stem 37 projects outwardly through the outer wall of body 33 and terminates in a cam engaging head 39. A return spring 40 encirces the stem 37 between the back side of the head 39 and the valve body 33 and continuously urges the valve stem 37 outwardly into sliding engagement of the corresponding cam 19 for appropriate positioning.

The several chambers 34 of valves 27–32 are interconnected by passageways integrally formed in the valve body 33 and described as follows. A main inlet passageway 41 is connected to the hard water supply conduit 9 from the main water source and extends through the valve body 33 into terminal communication with the first chamber 34–1 of the service valve 28. An outlet passageway 42 connects the chamber 35 of brine valve 27 and chamber 35–1 of the service valve 28 and in turn connected by a passageway 43 to the first chamber 34–2 of the backwash valve 29. A tank inlet passageway 44 is also connected to the first chamber 34–2 of the backwash valve 29 and to the softener tank inlet conduit 4. For normal service conditions following regeneration of the resin bed 3, valve 28 is open and valve 29 is closed for admitting water to tank 1, as follows: Water from the main supply line 9 flows through the passage 41, valve 28, passageways 42 and 43 to the chamber 34–2 of the closed valve 29, the inlet passageway 44 and conduit 4 to discharge the incoming water into the softener tank 1. Water flows down through the softening bed 3 during which flow the hardness ions are exchanged for sodium ions.

The softened water is withdrawn through conduit 5 as soft water, as follows.

An outlet passageway 45 in the valve body 33 is connected to the upper end of the discharge or outlet conduit 5 and to the inlet chamber or chamber 34–5 of the drain valve 32. An interconnecting outlet passageway 46 connects the chamber 34–5 of valve 32 to the chamber 35–4 of the valve 31 which in the normal service condition is open such that water may flow down through the valve 31. The softened water flows through the valve 31 to an outlet passageway 47 which is connected to the chamber 34–4 of valve 31 and to the soft water tap or supply line 10.

During a regeneration cycle, hard water is supplied to the tap line 10 via a passageway 48 which interconnects the passageway 41 to the chamber 35–3 of the bypass valve 30 which is normally closed. Whenever a regeneration cycle is initiated, however, the valve 30 opens and interconnects the passageway 48 to a bypass passageway 49 extending from chamber 34–3 of valve 30 to the outlet passageway 47.

A backwash passageway 50 interconnects the chamber 35–2 of the backwash valve 29 to the corresponding chamber 35–5 of the drain valve 32. The chamber 35–5 is connected directly to a drain passageway 51 in the valve body 33 which is connected to the drain line or conduit 14 for discharging into the waste system, not shown.

A slow rinse weep hole or passageway 53 is provided interconnecting the chamber 34–1 and 35–1 of the valve 28 to provide a continuous flow of water through the valve 28 during the regeneration cycle as hereinafter described.

A brine inlet passageway 54 is connected to the incoming brine supply line 13 and the chamber 34 of the brine valve 27. The outlet chamber 35 of the brine valve 27 is connected to the passageway 42. Opening of brine valve 27 feeds the brine to and through the passageways 42 and 43, chamber 34–2 of valve 29 and passageway 44 to the inlet side of the tank 1.

Figure 5:
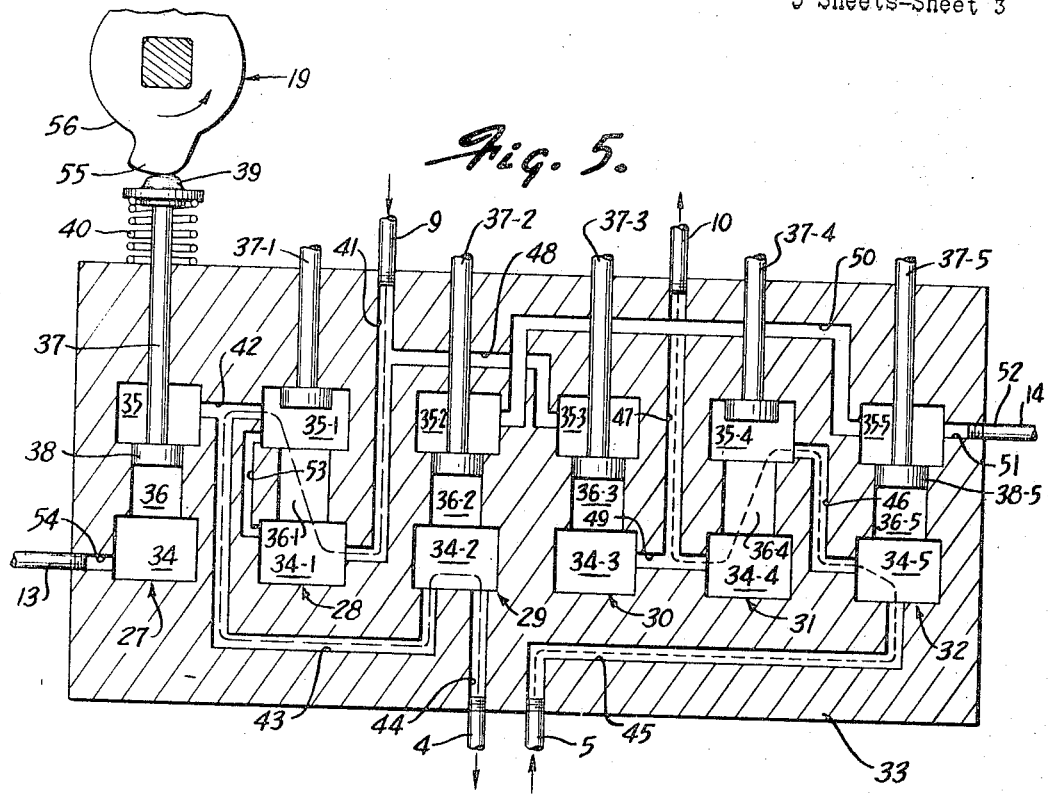
FIG. 5 is a diagrammatic illustration of the control valve shown in FIGS. 1–4 and shows the normal service position thereof.

The control valve 6 is shown in FIG. 5 in the normal service position wherein the water passes from passageway 41, through valve 28, passageways 42 and 43, valve 29 and passageway 44 to the softener tank 1, and from the tank through the passageway 45 and valve 32, passageway 46 and valve 31 to the outlet passageway 47 for supplying softened water to the consumer system.

Whenever the manual push button switch 17 or the clock timer switch unit 18 is actuated, motor 16 is energized and rotates the cam assembly 15 through one complete cycle with the cams 19 through 24 actuating valves 27 through 32.

Figure 4:
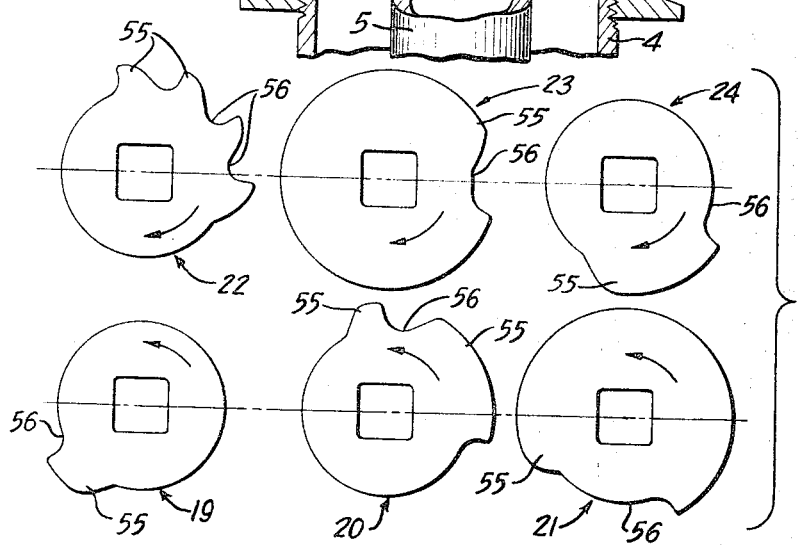
FIG. 4 is an exploded view showing the several cams employed to actuate the control valve as shown in FIGS. 2 and 3.

As shown most clearly in FIG. 4, each of the cams 19–24 is generally a disc-shaped member having the periphery formed with one or more projections 55 and recesses 56 to properly position the valves 27–32, inclusive. In FIG. 4, profiles of the several cams 19–24 are illustrated to produce the softening cycle described in connection with FIG. 10, which is a time graph of the valve positions, with the valve opening and closing as shown on the vertical axis and with the time or angular position of the cams shown on the horizontal axis. The positioning of the valves is not interrelated dimensionally on the vertical axis and the maximum or horizontal line relates to a fully open position for the corresponding valve.

At time 0, the valve 6 is in the position shown in FIG. 5 with the valves 28 and 31 open as shown by lines 57 and 58 in FIG. 10.

When a regeneration cycle is established, the cams 19–24 are rotated and establish the following valve sequence.

During an initial cam movement, the valves are maintained in their initial or normal service position; after which bypass valve 30 begins to gradually open to a fully opened position, as shown by graph line 59, for supplying water directly to the outlet passageway 47 during the regeneration cycle. The water flows, when demand is made, through the passageways 41 and 48, valve 30, passage 49 and outlet passageway 47, as previously described.

During the opening of the valve 30, the main service valve 28 moves rapidly from the open to the closed position prior to complete opening of valve 30, as shown by the vertical drop in graph line 57.

Figure 6:
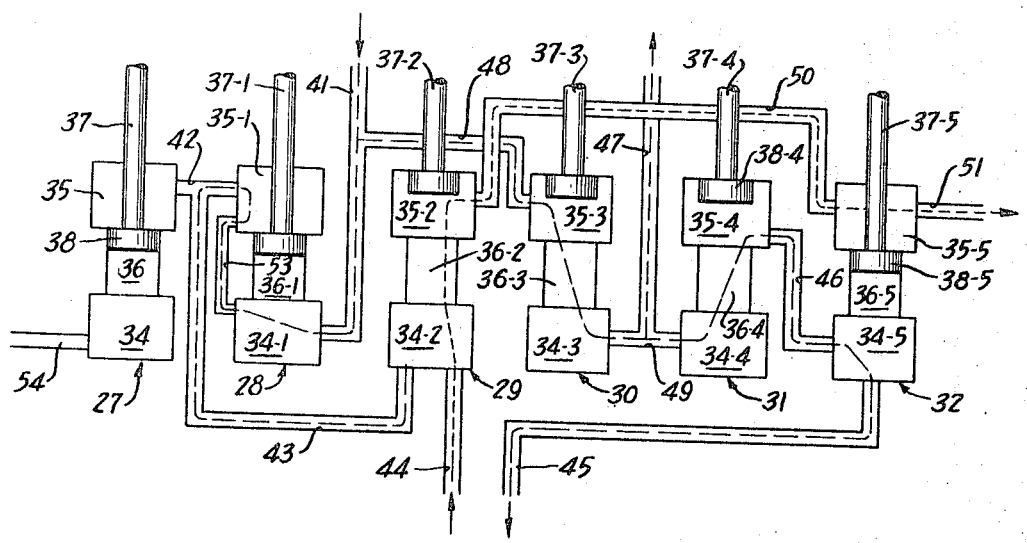
FIG. 6 is a view similar to FIG. 5 showing the backwash cycle position of the valve.

Simultaneously with the complete opening of valve 30, the backwash valve 29 begins to open and due to the shaping of the related cam, gradually moves to the open position. The other valves are maintained through the backwash cycle in the previously established position. As a result, the valve 6 establishes the following flow circuit as shown in FIG. 6 for backwashing of bed 3: the incoming water at passageway 41 flows through passageway 48 and valve 30, passageway 49, valve 31, passageway 46 and chamber 34–5 of valve 32, the outlet passageway 45, softener tank outlet conduit 5 to tank 1, through the tank 1 in an upward or backwash direction, out the normal inlet conduit 4, the valve passageway 44, backwash valve 29, backwash passageway 50, chamber 35–5 of drain valve 32, drain passageway 51 and drain line 52. The backwash cycle is maintained for a predetermined period as shown by graph line 60 after which valves 29 and 31 rapidly close and block the above flow path, and valves 27 and 32 open to establish a brine cycle position, as shown in FIG. 7.

Immediately prior to the terminating of the backwash cycle, the drain valve 32 begins to gradually open and continues to move to the fully open position after completion of the backwash cycle, as shown by the graph line 61. Following the termination of the backwash cycle and during the opening of valve 32, the main outlet valve 31 moves from the open to the closed position as shown by the vertical drop in line 58 to interrupt the connection between the outlet passageway 47 and the passageway 45 from the outlet of the softener tank 1. After the closing of the outlet service valve 31 and during the terminal opening of the drain valve 32, the brine valve 27 starts to gradually open but at a faster rate than the other valve openings, as shown by the increased slope of the first brine pulse graph line 62. This establishes the flow path of FIG. 7 which is traced as follows: brine flows from the brine line 13, passageway 54, valve 27, passageways 42 and 43, chamber 34–2 of valve 29 and passageway 44 to the inlet conduit or side of the tank 1, downwardly through the tank 1, outlet conduit 5, and valve passageway 45, drain valve 32, and valve passageway 51 to drain line or conduit 52. The brine solution introduced from the brine tank 11 is of an excessive concentration which is diluted with water from inlet conduit 9. Although valve 28 is closed, bypass passageway 53 carries a selected amount of water to passageway 42 where it mixes with the concentrated brine solution.

Figure 7:
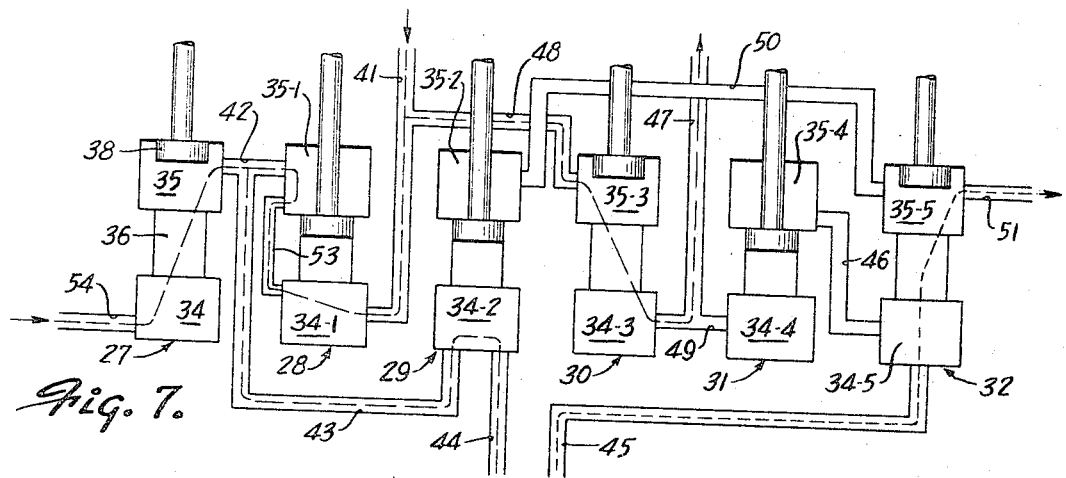
FIG. 7 is a view similar to FIG. 5 showing the brine cycle position of the valve.
Figure 8:
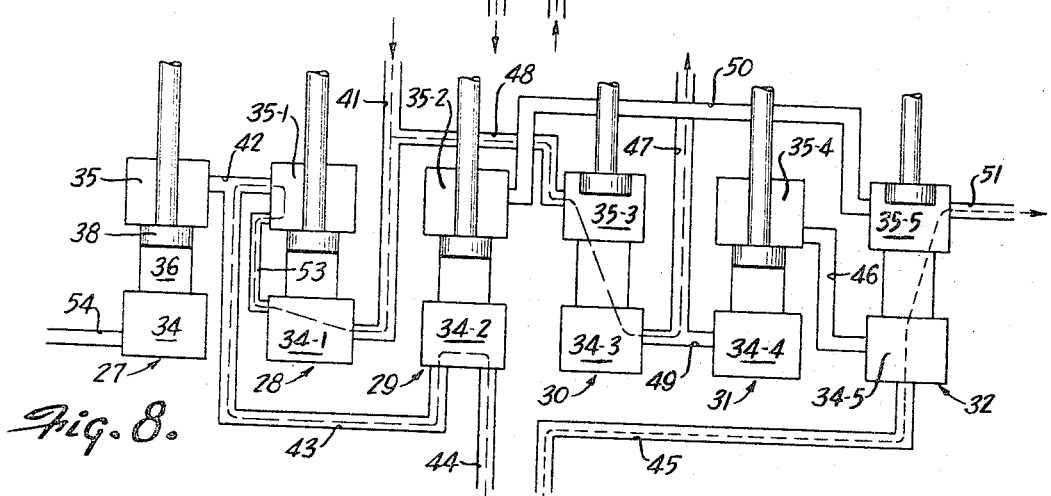
FIG. 8 is a view similar to FIG. 5 showing the slow rinse cycle position of the valve.

At the end of the first brine cycle the brine valve 27 is closed while all of the other cams are maintained in the position of FIG. 7; resulting in the slow rinse valve position shown in FIG. 8. In this position, the only flow through tank 1 is the small passage of water from the passageway 41, chamber 34–1 of valve 28, passageways 53, 42 and 43, valve 29, passageway 44, tank 1, passageway 45, valve 32, and passageway 51 to the drain line 52. This provides a slow rinse of the resin bed 3.

After a predetermined slow rinse period, the brine valve 27 again opens and re-establishes the flow path of FIG. 7 and a second fresh brine pulse is established for a second predetermined time, as shown by graph line 63, which may or may not be the same time as the first brine pulse. At the end of the second brine pulse, valve 27 is again closed to position valve 6 in the state of FIG. 8 whereby a second slow rinse cycle is established.

Third and fourth brine pulses separated by a slow rinse are similarly established, as shown by the spaced graph lines 64 and 65, by proper timed actuation of valve 27 through the proper construction of the associated cam 19.

The fourth brine pulse in the illustrated embodiment, shown by line 65, is followed by an extended slow rinse, by positioning of the valve unit as shown in FIG. 8.

Figure 9:
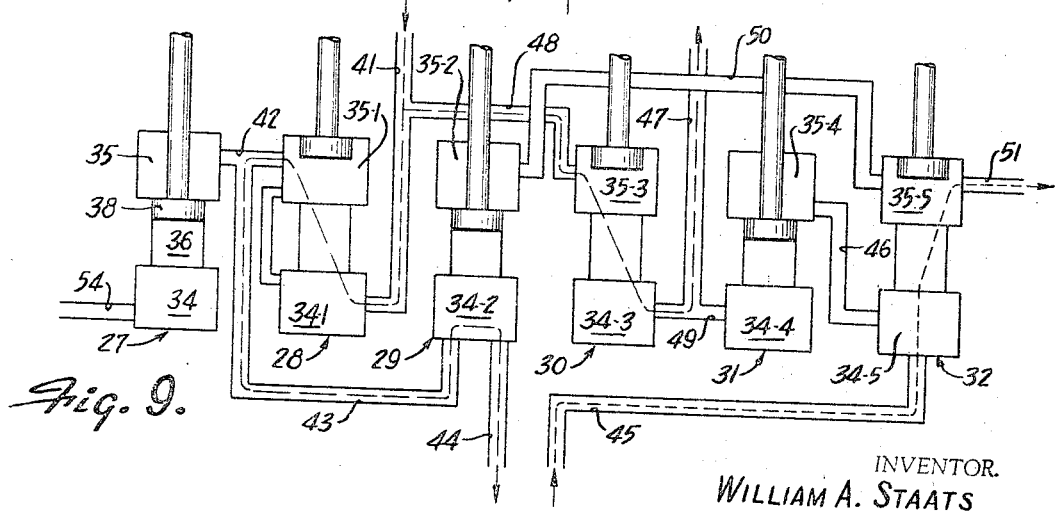
FIG. 9 is a view similar to FIG. 5 showing the fast rinse cycle position of the valve.

At the end of a predetermined slow rinse, the main service valve 28 is opened and establishes the positioning of valve unit 6 as shown in FIG. 9 which provides a fast rinse period shown in FIG. 10 by line 66. The flow through the tank 1 is substantially increased during this period. The first fast rinse is followed by a slight pause after which a second fast rinse is established, as shown in FIG. 10 by line 67.

At the terminal end of the fast rinse cycle, the drain valve 32 moves to the closed position, shown by a sharp drop in the corresponding graph line 61. This interrupts the path of FIG. 9 and terminates the regeneration of bed 3.

The bypass valve 30 closes and blocks the bypass water supply path through passageway 48. The outlet valve 31, which was previously closed after the backwash cycle, again opens to allow the normal flow through the softener tank between the inlet passage 41 and the outlet passageway 47 of the control valve 6, as shown in FIG. 5.

As most clearly shown by the graph of FIG. 10, the present invention takes the normal brine cycle and divides it into a plurality of relatively short cycles separated by slow rinse of the bed 3. Although the brine pulses have been shown as substantially similar in length, such is not critical and varying pulse lengths can be as advantageously employed. It has been found that the division of a normal brine volume necessary to regenerate a bed into a plurality of separated smaller pulses provides a very substantial increase in the overall efficiency of the regeneration cycle. For example, a pulse regeneration cycle employing a six port valve generally as heretofore described was employed for regenerating a resin bed of ½ cubic feet. The bypass passageway 53 was set to provide a slow rinse flow of substantially 0.63 gallon per minute and brine solution flow of substantially 0.24 gallon per minute. During a regeneration cycle, 5.25 pounds of salt in a brine solution was used. The resin bed 3 had a hardness capacity of approximately 15 kilograms. The following pulse regeneration cycle resulted in a salt efficiency of 0.35:

| | |
|---|---|
| From start of motor to beginning of backwash | 1′30″ |
| Backwash | 4′00″ |
| 1st brine pulse | 2′05″ |
| 1st slow rinse | 2′00″ |
| 2nd brine pulse | 2′05″ |
| 2nd slow rinse | 2′00″ |
| 3rd brine pulse | 2′05″ |
| 3rd slow rinse | 2′00″ |
| 4th brine pulse | 2′05″ |
| 4th slow rinse | 6′00″ |
| 1st fast rinse | 3′30″ |
| 2nd fast rinse | 3′30″ |
| Return to service | 2′15″ |
| | 34′55″ |

Because of time lags between opening and closing of valves, the total cycle time is 39.5′.

In comparison, a regular regeneration cycle employing the same six port valve for a substantially similar unit shows a salt efficiency of only 0.475. In the regular regeneration cycle, a slightly larged bed of 0.53 cubic feet of an identical resin was used. A brining rate of 0.25 gallon per minute was employed and the total salt used was 6.4 pounds. A slow rinse rate of 0.35 gallon per minute was employed. The bed was found to have an exchange capacity of only 13.5 kilograms. The regular regeneration cycle was as follows:

| | |
|---|---|
| Start of motor to start of backwash | 1'36" |
| Backwash cycle | 8'06" |
| Brining cycle | 9'42" |
| Slow rinse | 5'42" |
| First fast rinse pulse | 4'36" |
| Second fast rinse pulse | 4'15" |
| | 33'47" |
| Total length of cycle | 39'30" |

Thus, it is seen that a pulse brining cycle substantially increases the efficiency of the system either by increasing the capacity or reducing the total salt used. The advantage of of pulse brining appears to be based upon the known reversible ion exchange process. Thus, the rate of ion exchange is dependent upon the relative concentrations of the ions involved in the ion exchange process. In the brine pulsing of the present invention, each brine pulse produces a maximum softening ion concentration and each slow rinse minimizes the hardening ion concentration and thereby minimizes the reversible ion exchange of hardening ions back into the bed.

In the illustrated embodiment of the invention, the input conduit 4 of the softener tank 1 extends downwardly through the freeboard area and terminates immediately adjacent the upper surface of the resin exchange bed 3. The lower end of conduit 4 includes a distributing screen 68 which disperses the brine solution over the top of the bed 3 during each brining cycle. This has been found to provide maximum efficiency. It would appear that the use of the dip tube construction substantially reduces dilution of the brine solution with the water in the freeboard area and maintains the brine at the selected concentration. The dip tube is important where it is desired to closely approach the theoretical capacity of the resins employed in bed 2. During backwash, the resin bed 3 will move upwardly over the lower screened end 68 of conduit 4 and prevent free backwash flow through the normal discharge end thereof. A plurality of slits 69 are provided in the conduit 4 adjacent the upper end to discharge the backwash water. During brining however, the brine solution, because it has a density greater than water, passes the slits 69 and is distributed over the bed by the screened end 68 to prevent dilution thereof and thereby presenting a maximum ion concentration.

The exact cycle selected in accordance with this invention will depend upon the brine concentration, brine and rinse times as well as the size of the bed. Generally, it has been found that increasing the rinse time increases the brine efficiency. However, this increases the regeneration time cycle which may be considered undesirable.

The present invention provides a method and apparatus for improved regeneration of water softener or other similar ion exchange system. In particular, the present invention permits improving any or all of the three characteristics of a softener: capacity, efficiency and or size of the bed. The improvement of this invention can be applied to existing systems by proper contouring of the control cams or the like.

Various modes of carrying out the invention are contemplated as being within the scope of the following claims particularly pointing out and distinctly claiming the subject matter which is regarded as the invention.

I claim:
1. In an ion exchange process wherein an ion-carrying bed carries a concentration of replacement ions to be exchanged for displaceable ions in a liquid passed through the bed, the regeneration process for periodically regenerating the bed to remove the displaceable ions and provide a new concentration of said replacement ions, comprising
   (a) sequentially and alternately passing in a continuous flow process pulses of a concentrated replacement ion solution and a rinse liquid through said bed, the volume and flow rate of said pulses being selected whereby each of said pulses contributes substantially to the regeneration of the bed.

2. In an ion exchange process wherein an ion-carrying bed carries a concentration of replacement ions to be exchanged for displaceable ions in a liquid passed through the bed, the regeneration process for periodically regenerating the bed to remove the displaceable ions and provide a new concentration of said replacement ions, the continuous flow process including the steps of
   (a) sequentially passing in time spaced relation selected volumes of a concentrated replacement ion solution through the bed with each pass similarly and only partially regenerating the bed, and
   (b) passing a fresh water rinse through the bed immediately after each volume of the solution.

3. In an ion exchange process wherein an ion-carrying granulated bed carries a concentration of replacement ions to be exchanged for displaceable ions in a liquid passed through the bed, the regeneration process for periodically regenerating the bed to remove the displaceable ions and provide a new concentration of said replacement ions, comprising
   (a) passing a selected volume of concentration solution effective to substantially regenerate the bed in a single pass through the bed as a series of time-spaced similar pulses, and
   (b) passing a rinse liquid through the bed between each of said time-spaced solutions.

4. In an ion exchange process wherein an ion-carrying granulated bed carries a concentration of replacement ions to be exchanged for displaceable ions in a liquid passed through the bed, the regeneration process for periodically regenerating the bed to remove the displaceable ions and provide a new concentration of said replacement ions, comprising
   (a) backwashing said bed with fresh water,
   (b) a first pulse brining of said bed with a fresh concentrated brine solution for a selected period,
   (c) fresh water rinsing of said bed for a selected period,
   (d) a second pulse brining of said bed with a concentrated brine solution corresponding to the first pulse brining,
   (e) a second fresh water rinsing of said bed,
   (f) a third pulse brining of said bed with a concentrated brine solution corresponding to the first pulse brining,
   (g) a third fresh water rinsing of said bed,
   (h) a fourth pulse brining of said bed with a concentrated brine solution corresponding to the first pulse brining, and
   (i) a fourth fresh water rinse of said bed for a substantially longer period than any one of said other rinses.

5. In an ion exchange process wherein an ion-carrying granulated bed carries a concentration of replacement ions to be exchanged for displaceable ions in a liquid passed through the bed, the regeneration process for periodically regenerating the bed to remove the displaceable ions and provide a new concentration of said replacement ions, comprising
   (a) sequentially passing a multiple of time-spaced quantities of a fresh concentrated regenerating solution of the replacement ions through the bed, and
   (b) passing a rinse liquid through the bed between each of said solutions of the replacement ions.

6. In a water softener system including a softener tank having an ion-carrying bed adapted to be saturated with a concentration of sodium ions by passage of a brine solution from a storage tank therethrough and having a multiple port valve having a standby position for connecting the bed in a water system and a regeneration position for disconnecting the bed from the water system and selectively connecting the bed for regeneration, the improvement comprising (a) means for actuating said valve to sequentially operably connect the storage tank and the softener tank in a brine flow circuit and thereby transmitting a series of brine pulses of a fresh brine solution to the softener tank and to pass a rinse water through the bed after each of said brine pulses.

7. The softener system of claim 6 having,
(a) means to establish a continuous slow flow of water through the bed during a regeneration cycle to dilute the fresh brine solution and to provide the rinse water between successive brine pulses.

8. The softener system of claim 6 having,
(a) a cam means for positioning said multiple port valve having a cam for sequentially connecting the storage tank to the softener tank in predetermined time-spaced relation, and
(b) motor means to rotate the cam means through a complete cycle for regenerating the bed.

9. In a water sofetning device,
(a) an enclosure having an ion exchange bed secured therein with a freeboard area immediately above the bed, the bed being regenerated by passing a replacement ion exchange solution downwardly therethrough after backwashing by passing water upwardly therethrough and the bed expanding upwardly during backwashing of the bed,
(b) a dip tube member secured to the upper end of the enclosure and projecting through the freeboard area with the lower end spaced from the top surface of the bed and having openings at the top and bottom, and
(c) means to sequentially establish a backwashing of the bed and thereafter alternately pass in a continuous flow process pulses of concentrated ion exchange solution and a rinse liquid through said bed.

10. In a water softening device,
(a) an enclosure having an ion exchange bed secured therein with a freeboard area immediately above the bed, the bed being regenerated by passing a replacement ion exchange solution downwardly therethrough after backwashing by passing water upwardly therethrough and the bed expanding upwardly during backwashing of the bed, and
(b) a dip tube member secured to the upper end of the enclosure and projecting through the freeboard area with the lower end adjacent the top surface of the bed and having first openings at the lower end and second openings spaced from the first openings and adjacent the upper end of the enclosure.

11. In a water softening device,
(a) an enclosure having an ion exchange bed secured therein with a freeboard area immediately above the bed, the bed being regenerated by passing a replacement ion exchange solution downwardly therethrough after backwashing by passing water upwardly therethrough and the bed expanding upwardly during backwashing of the bed, and
(b) a dip tube member secured to the upper end of the enclosure and projecting through the freeboard area with a lower open end spaced from the top surface of the bed, and a distributor screen covering the lower open end of the dip tube member, said dip tube member having openings therein spaced from the lower end thereof adjacent the upper end of the enclosure.

12. The water softening device as set forth in claim 11, in which the replacement ion exchange solution is dispersed over the top of the ion exchange bed by the distributor screen, and said openings in the dip tube member adjacent the upper end of the enclosure discharge the backwash water from the enclosure.

References Cited

UNITED STATES PATENTS

| | | | |
|---|---|---|---|
| 2,800,229 | 7/1957 | Spaulding | 137—624.13 |
| 2,902,155 | 9/1959 | Lundeen | 210—190 |
| 3,078,224 | 2/1963 | Schultze et al. | 210—30 |
| 3,143,500 | 8/1964 | Damgaard | 210—190 |
| 3,216,931 | 11/1965 | Dennis et al. | 210—30 |

JOSEPH SCOVRONEK, *Acting Primary Examiner.*

MORRIS O. WOLK, *Examiner.*

E. G. WHITBY, *Assistant Examiner.*